United States Patent [19]
Torii

[11] Patent Number: 5,107,115
[45] Date of Patent: Apr. 21, 1992

[54] RADIATION IMAGE INFORMATION READING APPARATUS

[75] Inventor: Shumpeita Torii, Kanagawa, Japan

[73] Assignee: Fuji Photo Film Co., Ltd., Kanagawa, Japan

[21] Appl. No.: 743,619

[22] Filed: Aug. 12, 1991

[30] Foreign Application Priority Data

Aug. 23, 1990 [JP] Japan .................. 2-221898

[51] Int. Cl.$^5$ ......................................... G01M 23/04
[52] U.S. Cl. .............................................. 250/327.2
[58] Field of Search ........................... 250/327.2, 484.1

[56] References Cited

U.S. PATENT DOCUMENTS 4,900,926 2/1990 Yoshimura et al. .......... 250/484.1 B

FOREIGN PATENT DOCUMENTS 55-12429   1/1980  Japan .
55-116340  9/1980  Japan .
55-163472 12/1980  Japan .
56-11395   2/1981  Japan .
56-104645  8/1981  Japan .
59-17200   1/1984  Japan .
64-56432   3/1989  Japan .

Primary Examiner—Carolyn E. Fields
Attorney, Agent, or Firm—Sughrue, Mion, Zinn, Macpeak & Seas

[57] ABSTRACT

Disclosed herein is a radiation image information reading apparatus comprising an unloading mechanism for unloading a plurality of light-intransmissive holders one by one from a supply container for accommodating therein the plurality of light-intransmissive holders in a stacked manner, which are used to hold therein storage-type phosphor sheets with radiation image information stored and recorded thereon; a sheet discharging mechanism for discharging a storage-type phosphor sheet from one unloaded out of the plurality of light-intransmissive holders; a reading unit for photoelectrically reading radiation image information stored and recorded on the storage-type phosphor sheet thus discharged; an erasing unit for erasing any remaining radiation image information on the so-read storage-type phosphor sheet therefrom; a sheet loading mechanism for loading the light-intransmissive holder with the so-erased storage-type phosphor sheet; and a feed mechanism for feeding the light-intransmissive holder with the so-erased storage-type phosphor sheet stored therein into a receiving container. The loading mechanism comprising a device for opening and closing the light-intransmissive holder and a device for feeding the storage-type phosphor sheet into the light-intransmissive holder.

8 Claims, 4 Drawing Sheets

RADIATION IMAGE INFORMATION READING APPARATUS

BACKGROUND OF THE INVENTION

1. Field of the Invention

The present invention relates to a radiation image information reading apparatus for unloading a storage-type phosphor sheet from one of a plurality of light-intransmissive holders to photoelectrically read radiation image information stored and recorded on the so-unloaded storage-type phosphor sheet, and erasing any remaining radiation image information from the so-read storage-type phosphor sheet, followed by charging the light-intransmissive holder with the erased storage-type phosphor sheet.

2. Description of the Related Art

There has recently been proposed a radiation image information recording and reproducing system of a type wherein radiation image information of an object such as a human body is first stored and recorded on a storage-type phosphor sheet using a stimulable phosphor, and the storage-type phosphor sheet is then scanned with stimulating rays to emit accelerated light therefrom, thereby photoelectrically detecting the emitted light so as to produce an image information signal that is electrically processed for generating a radiation image of the object (see, for example, Japanese Laid-Open Patent Publications Nos. 55-12429, 56-11395, 55-163472, 56-104645, 55-116340, etc.).

In the radiation image information recording and reproducing system, the radiation image information of the object is recorded on the storage-type phosphor sheet in a state in which the storage-type phosphor sheet is accommodated in a cassette. Then, the storage-type phosphor sheet is unloaded from the cassette to photoelectrically read the image information therefrom in an image information reading apparatus. It is, however, difficult to use such a cassette upon dental exposure.

Therefore, there has been proposed a light-shading or -intransmissive holder which has a light-intransmissive characteristic and is rendered transmissive of radioactive rays, for holding therein a storage-type phosphor sheet (see Japanese Laid-Open Patent Publication No. 59-17200).

However, when the light-intransmissive holder is used, an exposed storage-type phosphor sheet is unloaded from the light-intransmissive holder in a dark room so as to be accommodated in a cassette or magazine. Thereafter, a radiation image information reading apparatus must be charged with the storage-type phosphor sheet thus accommodated, so that the entire process is cumbersome.

Therefore, there has been proposed a radiation image information reading apparatus of a type wherein one of light-intransmissive holders is automatically opened to unload a storage-type phosphor sheet therefrom, to which stimulating or exciter light is applied, thereby photoelectrically reading, i.e., detecting accelerated light emitted from the storage-type phosphor sheet so as to produce an image information signal which is electrically processed for generating image information to be recorded, and any remaining image information on the storage-type phosphor sheet is then erased therefrom and thereafter the erased storage-type phosphor sheet is fed into the light-intransmissive holder (see Japanese Laid-Open Patent Publication No. 64-56432).

In the aforementioned radiation image information reading apparatus, the light-intransmissive holders are inserted one by one into the apparatus. Therefore, when it is desired to process or handle a number of light-intransmissive holders in particular, the operator must manually carry out the process for unloading the light-intransmissive holders one by one from the magazine with these light-intransmissive holders stored therein so as to charge the apparatus with the same. Thus, the entire process for reading the image information from the storage-type phosphor sheet cannot efficiently be carried out.

SUMMARY OF THE INVENTION

With the foregoing problems in view, it is a principal object of the present invention to provide a radiation image information reading apparatus wherein storage-type phosphor sheets can be automatically unloaded one by one from a number of light-intransmissive holders with the storage-type phosphor sheets held therein, and the process for photographically recording radiation image information of an object on a storage-type phosphor sheet so as to photoelectrically read the same from the so-recorded storage-type phosphor sheet can be efficiently and easily carried out, thereby making it possible to carry out the entire process highly accurately.

It is another object of the present invention to provide a radiation image information reading apparatus comprising unloading means for unloading a plurality of light-intransmissive holders one by one from a supply container for accommodating therein the plurality of light-intransmissive holders, the holders being used to hold therein respectively corresponding storage-type phosphor sheets with radiation image information stored and recorded thereon, sheet discharging means for discharging a storage-type phosphor sheet from one unloaded out of the plurality of light-intransmissive holders, reading means for photoelectrically reading radiation image information stored and recorded on the storage-type phosphor sheet thus discharged, erasing means for erasing any remaining radiation image information on the so-read storage-type phosphor sheet therefrom, sheet loading means for loading the light-intransmissive holder with the so-erased storage-type phosphor sheet, and carrying-in means for carrying the light-intransmissive holder with the so-erased storage-type phosphor sheet held therein into a receiving container, the loading means comprising means for opening and closing the light-intransmissive holder, and means for feeding the storage-type phosphor sheet into the light-intransmissive holder.

It is a further object of the present invention to provide the radiation image information reading apparatus wherein the sheet discharging means serves as the sheet loading means, and includes light-intransmissive holder supporting means angularly movable with respect to a supply magazine as the supply container and a receiving magazine as the receiving container, the supply magazine being used to accommodate therein the plurality of light-intransmissive holders in which the storage-type phosphor sheets with the radiation image information stored and recorded thereon are held, and the receiving magazine being used to receive therein the light-intransmissive holder with the erased storage-type phosphor sheet held therein.

It is a still further object of the present invention to provide the radiation image information reading apparatus wherein the light-intransmissive holder supporting means comprises a pair of guide plates for guiding each of the light-intransmissive holders therealong, and pairs of support rollers for supporting therebetween one of opposite ends of each of the light-intransmissive holders, said one being opened in a transverse direction of each of the light-intransmissive holders.

It is a still further object of the present invention to provide the radiation image information reading apparatus wherein the opening and closing means comprises a pair of pin members for pressing one of both sides of each of the light-intransmissive holders in an upward direction so as to be positioned away from the other thereof, thereby providing an opened one end of each of the light-intransmissive holders, and a pair of tapered members activated to be inserted into the opened one end so as to further widen the opened one end.

It is a still further object of the present invention to provide the radiation image information reading apparatus wherein the tapered members have feed means capable of inserting a storage-type phosphor sheet into each of the light-intransmissive holders and unloading the same therefrom in a state in which the feed means is being inserted into the opened one end of each of the light-intransmissive holders.

It is a still further object of the present invention to provide the radiation image information reading apparatus wherein the feed means includes pairs of rollers supported by the tapered members.

It is a still further object of the present invention to provide the radiation image information reading apparatus wherein the pin members are swingably supported by a resilient member, and include thin-walled portions held in engagement with the tapered members when the one side of each of the light-intransmissive holders is pressed upward, and thick-walled portions held in engagement with the tapered members when the tapered members are moved away from each of the light-intransmissive holders.

It is a still further object of the present invention to provide the radiation image information reading apparatus wherein the unloading means comprises a pair of feed rollers rotatably movable into the supply container, and adhesive means applied on the outer peripheral surface of each of the feed rollers.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
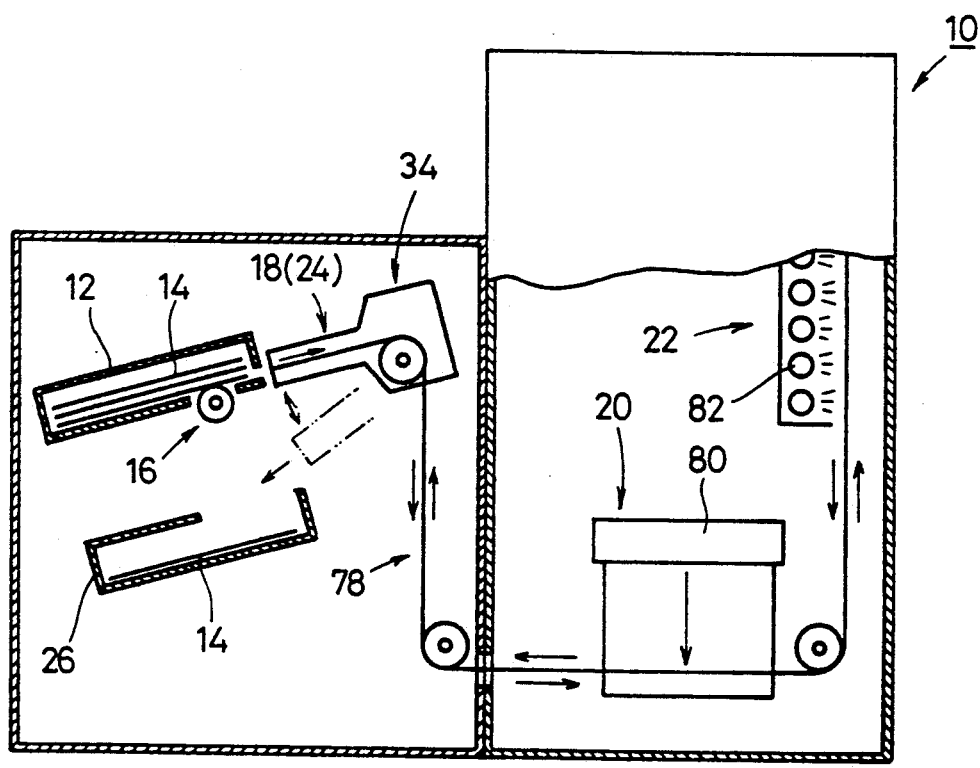
FIG. 1 is a view schematically showing a structure of a radiation image information reading apparatus according to a first embodiment of the present invention.

Referring to FIG. 1, designated at numeral 10 is a radiation image information reading apparatus according to a first embodiment of the present invention. The radiation image information reading apparatus 10 comprises an unloading mechanism 16 for unloading a plurality of stacked light-shading or -intransmissive holders 14 one by one, which are used to accommodate therein stimulable or storage-type phosphor sheets IP with radiation image information stored and recorded thereon, and which are disposed in a supply magazine (supply container) 12, a sheet delivering or discharging mechanism 18 for delivering, i.e., discharging a storage-type phosphor sheet IP from one unloaded out of the stacked light-intransmissive holders 14, a reading unit 20 for photoelectrically reading radiation image information stored and recorded on the storage-type phosphor sheet IP thus delivered, an erasing unit 22 for erasing any remaining radiation image information on the so-read storage-type phosphor sheet IP therefrom, a sheet loading mechanism 24 for loading a light-intransmissive holder 14 with thus erased storage-type phosphor sheet IP, and a carrying-in mechanism 28 for carrying the light-intransmissive holder 14 with the so-erased storage-type phosphor sheet IP accommodated therein into a receiving magazine (receiving container) 26 (see FIG. 2 or the like).

The light-intransmissive holder 14 has a light-intransmissive characteristic, and is rendered transmissive of a radiation such as X-rays, etc. After radiation image of an object is photographically recorded on a storage-type phosphor sheet IP by an unillustrated radiation exposure device in a state in which the storage-type phosphor sheet IP is accommodated in the light-intransmissive holder 14, thusprocessed individual light-intransmissive holders 14 are accommodated in the supply magazine 12 in a stacked manner.

The unloading mechanism 16 has a pair of feed rollers 30 movable into the supply magazine 12, a rotative drive source (not shown) coupled to the feed rollers 30, and an adhesive tape 32 with its adhesive face directed outward, which is applied on the outer peripheral wall of each of the feed rollers 30, The sheet delivering mechanism 18 serves as the sheet loading mechanism 24, and has a swingable frame 34 serving as a light-intransmissive holder supporting means, which can be angularly moved with respect to the supply magazine 12 and the receiving magazine 26. The swingable frame 34 includes an opening and closing means 36 for opening and closing a light-intransmissive holder 14, and a feed means 38 for feeding each of storage-type phosphor sheets IP in a desired direction.

Figure 2:
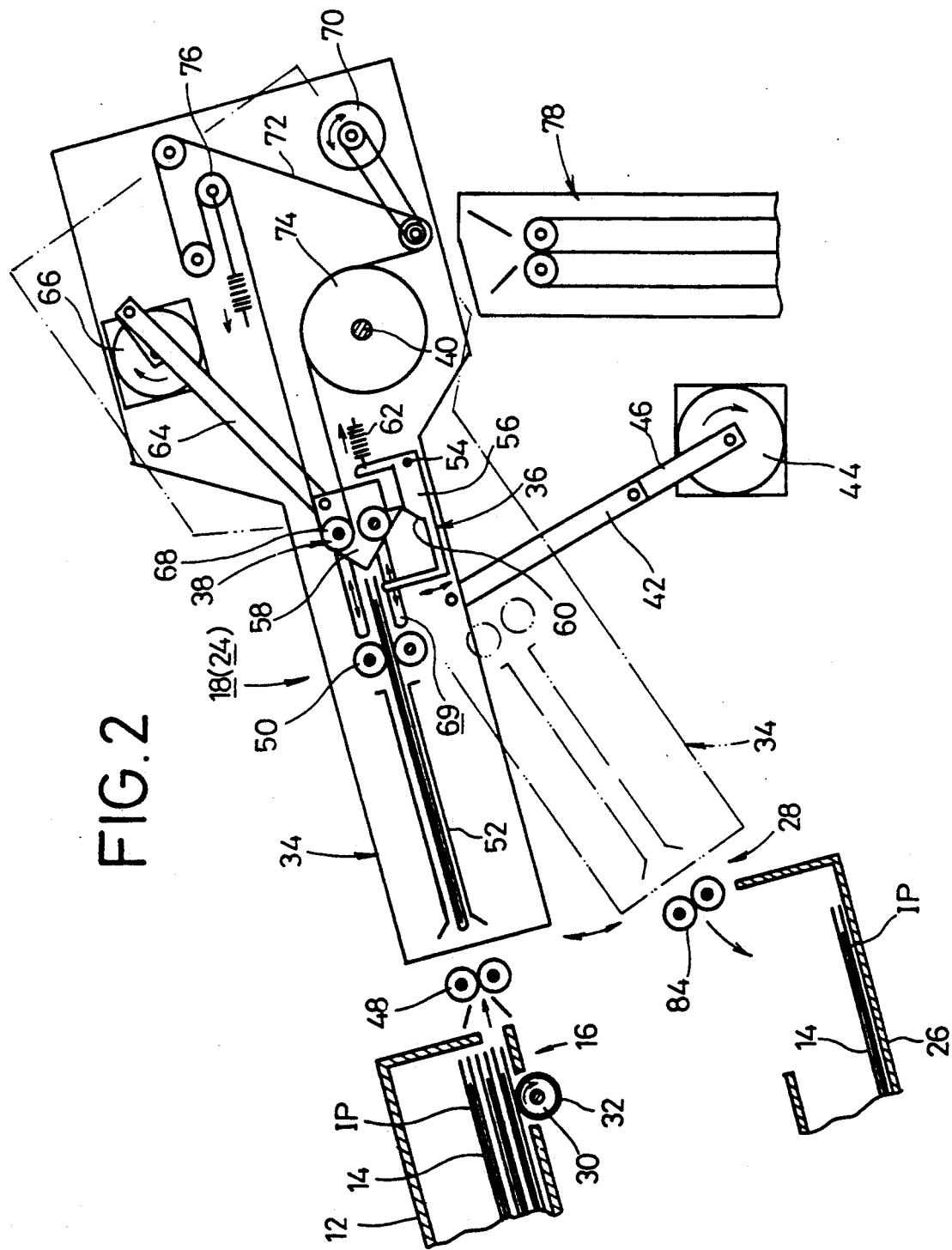
FIG. 2 is a view for describing a main portion of the radiation image information reading apparatus.

As shown in FIG. 2, the swingable frame 34 is angularly moved about a supporting point 40. One end of an arm 42 engages the swingable frame 34, whereas the other end thereof is engaged with a link 46 coupled to a rotative drive source 44. Pairs of feed rollers 48 are disposed on the side of the leading end of the swingable frame 34. In addition, pairs of support rollers 50 are disposed in a position where they are spaced at predetermined intervals each corresponding to the length of a light-intransmissive holder 14 from the feed rollers 48. A pair of guide plates 52 is provided between the pairs of the feed roller 48 and the pairs of the support rollers 50.

The opening and closing means 36 has a pair of pin members 56 used for the opening and closing of a light-intransmissive holder 14, which is supported on the swingable frame 34 by a supporting point 54, and a pair of tapered members 58 used to open and close the light intransmissive holder 14. Each of the paired pin members 56 has a slanted surface 60 defined therein extending from a thick-walled portion of each of the pin members 56 to a thin-walled portion thereof, and a tension spring 62 is fixedly secured to an end of each of the pin members 56 on the side of the supporting point 54.

The respective tapered members 58 can be inserted into an opened leading end of a light-intransmissive holder 14 and are spaced away from each other at an interval longer than the length or dimension defined in a direction perpendicular to a direction in which a storage-type phosphor sheet IP is fed. One end of an arm 64 is fixedly secured to each of the paired tapered members 58, and a rotative drive source 66 engages the other end of the arm 64. In addition, pairs of feed rollers 68 of the feed means 38 are held between the respective tapered members 58.

Each of the paired feed rollers 68 is guided along a pair of parallel guide grooves 69 defined in the swingable frame 34, and rotatably driven by a belt 72 trained around a rotative drive source 70. The belt 72 is trained around a pair of reversible rollers 74 and a pair of tension rollers 76 or the like. A rotatable shaft of each of the reversible rollers 74 serves as the supporting point 40.

Below the reversible rollers 74, there is disposed one end of a feed mechanism 78, which reaches the reading unit 20 and the erasing unit 22. The reading unit 20 has a laser beam source 80 from which stimulating rays are generated. In addition, a storage-type phosphor sheet IP is scanned with the stimulating rays in a direction normal to an auxiliary scanning direction (indicated by the arrow X).

The erasing unit 22 has an erasing light source 82 from which erasing light is generated. The erasing light source 82 is energized to irradiate a storage-type phosphor sheet IP with the erasing light, thereby emitting any remaining radiation energy on the storage-type phosphor sheet IP therefrom. As an alternative to the erasing light source 82, a heating means may be used to enable the remaining radiation energy to be emitted or discharged from the sheet IP.

The carrying-in mechanism 28 is used to carry a light-intransmissive holder 14 with the erased storage-type phosphor sheet IP stored therein into the receiving magazine 26. In addition, the carrying-in mechanism 28 has pairs of feed rollers 84 disposed near the receiving magazine 26.

A description will now be made of operation of the radiation image information reading apparatus 10 constructed as described above according to the present embodiment.

Light-intransmissive holders 14 with storage-type phosphor sheets IP held therein on which radiation image information of objects are stored and recorded by making use of an unillustrated exposure device, are accommodated in the supply magazine 12 in a stacked manner. Then, the radiation image information reading apparatus 10 is charged with the supply magazine 12 unloaded from the exposure device.

Then, the feed rollers 30 of the unloading mechanism 16 enter the supply magazine 12. In addition, the feed rollers 30 are rotated to cause the adhesive tape 32 to unload a single light-intransmissive holder 14 from an opening defined in the supply magazine 12.

Figure 3A:
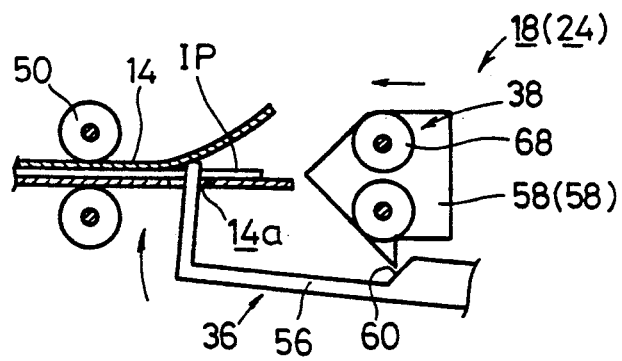
FIG. 3 is a view for describing the operation of the radiation image information reading apparatus.

The feed rollers 48 are rotated to guide the so-unloaded light-intransmissive holder 14 to the guide plates 52, thereby introducing the light-intransmissive holder 14 into the swingable frame 34, and thereafter the opened leading end of the light-intransmissive holder 14 is supported by the support rollers 50. Then, the rotative drive source 66 of the opening and closing means 36 is energized to cause the arm 64 to displace the tapered members 58 toward the support rollers 50. Therefore, the tapered members 58 are moved from the thick-walled portions to the thin-walled portions of the pin members 56 along the slanted surfaces 60. In addition, the pin members 56 are angularly moved upward about the supporting point 54 under the tension of the tension spring 62. Therefore, the pin members 56 enter a through hole 14a defined in one of both sides of the light-intransmissive holder 14 so as to press the other thereof in an upward direction (see FIG. 3a).

Figure 3B:
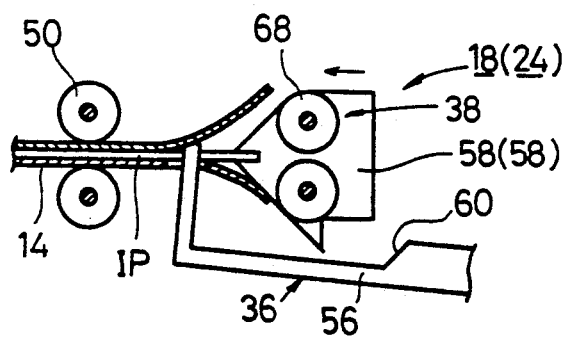
Figure 3C:
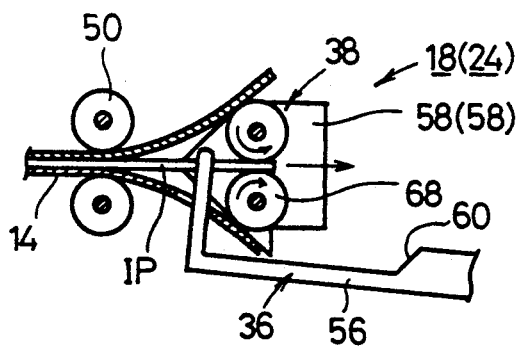

After the leading end of each of the tapered members 58 enters the opened leading end of the light-intransmissive holder 14 and the opened leading end thereof is further opened (see FIG. 3b), the feed rollers 68 hold a storage-type phosphor sheet IP in the light-intransmissive holder 14 therebetween (see FIG. 3c). Under this condition, the rotative drive source 70 is energized to rotate the feed rollers 68 by the belt 72, thereby delivering the storage-type phosphor sheet IP held therebetween to the feed mechanism 78 from the reversible rollers 74.

The laser beam source 80 is energized to feed the storage-type phosphor sheet IP fed through the feed mechanism 78 to the reading unit 20, in a main scanning direction, where it is scanned, and to feed the same in an auxiliary scanning direction by the feed mechanism 78. Thereafter, radiation image information stored and recorded on the storage-type phosphor sheet IP is photoelectrically read.

Then, the so-read storage-type phosphor sheet IP is subjected to erasing light generated from the erasing light source 82 in the erasing unit 22 so as to emit or discharge any remaining radiation energy on the sheet IP. In addition, the storage-type phosphor sheet IP thus processed is fed through the feed mechanism 78 to the sheet loading mechanism 24, i.e., the sheet delivering mechanism 18.

In the sheet loading mechanism 24 (sheet delivering mechanism 18), the rotative drive source 44 is energized to cause the link 46 and the arm 42 to angularly move the swingable frame 34 downwardly about the supporting point 40 (see the two-dot chain line shown in FIG. 2). The storage-type phosphor sheet IP fed through the belt 72 and the reversible rollers 74 to the feed rollers 68 of the feed means 38 is inserted into the light-intransmissive holder 14 held between the support rollers 50.

Then, when the rotative drive source 66 of the feed means 38 is energized to displace the tapered members 58 in a direction away from the support rollers 50, the tapered members 58 are moved toward the thick-walled portions of the pin members 56 along the slanted surfaces 56 thereof, so that the pin members 56 are angularly moved downward against the tension spring 62, thereby releasing the pin members 56 from the light-intransmissive holder 14.

The light-intransmissive holder 14 is discharged into the receiving magazine 26 by way of the support rollers 50 and the feed rollers 84 in a state in which the erased storage-type phosphor sheet IP is accommodated therein.

After a predetermined number of light-intransmissive holders 14 have been stored in the receiving magazine 26, the receiving magazine 26 is unloaded from the radiation image information reading apparatus 10 so as to be inserted again into the unillustrated exposure device.

In the present embodiment, when the radiation image information reading apparatus 10 is simply charged with the supply magazine 12 unloaded from the unillustrated exposure device, light-intransmissive holders 14 are fed to the swingable frame 34 one by one by the unloading mechanism 16. Thereafter, storage-type phosphor sheets IP stored in the light-intransmissive holders 14 is delivered to the feed mechanism 78 by the sheet delivering mechanism 18. Further, they are subjected to reading and erasing processes and thereafter accommodated in respectively corresponding light-intransmissive holders 14, after which these holders 14 are discharged into the receiving magazine 26. Thus, the conventional processes, which the operator is required to do, for transferring storage-type phosphor sheets IP from light-intransmissive holders 14 to a cassette or a magazine in a dark room and for charging the radiation image information reading apparatus with the light-intransmissive holders 14 one by one, are not necessary. The entire operation can thus be rendered efficient and simplified.

Further, the sheet delivering mechanism 18 serves as the sheet loading mechanism 24, and provided with the feed means and the opening and closing means 36. Therefore, the processes for delivering or discharging storage-type phosphor sheets IP from light-intransmissive holders 14 one by one to the swingable frame 34 and for carrying the storage-type phosphor sheets IP into the light-intransmissive holders 14 respectively can promptly be carried out, thereby making it possible to efficiently perform the image reading process by mean of the radiation image information reading apparatus 10.

Figure 4:
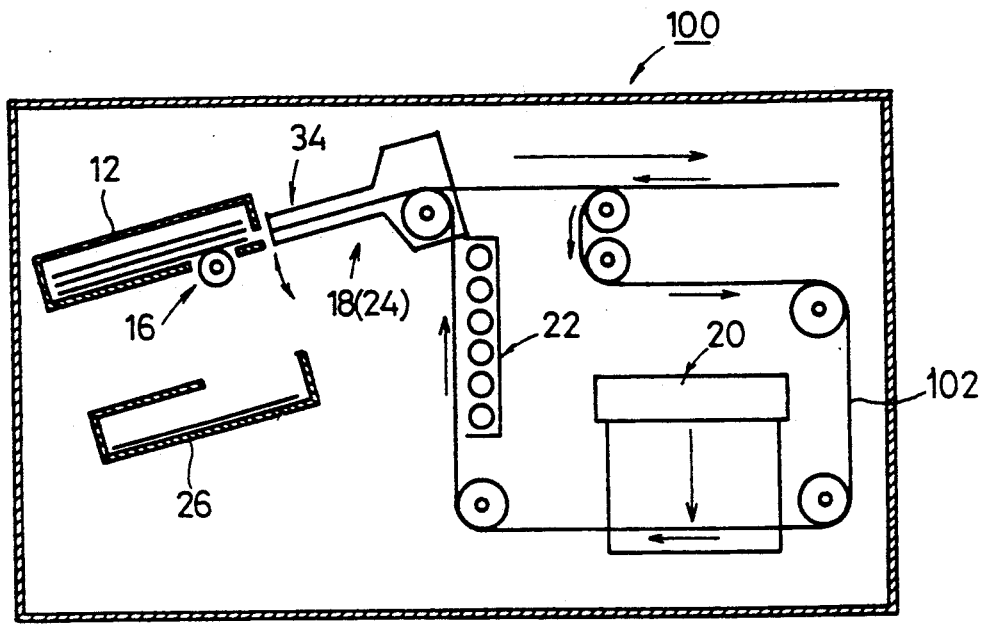
FIG. 4 is a schematic view of a radiation image information reading apparatus according to a second embodiment of the present invention.

FIG. 4 shows a radiation image information reading apparatus according to a second embodiment of the present invention. Those parts shown in FIG. 4 which are identical to those of the radiation image information reading apparatus 10 according to the first embodiment are identified by like reference numerals, and their detailed description will therefore be omitted.

A radiation image information reading apparatus 100 according to the second embodiment has a circulation feed mechanism 102. Thus, a process for reading a large number of storage-type phosphor sheets IP can be carried out more efficiently.

Figure 5:
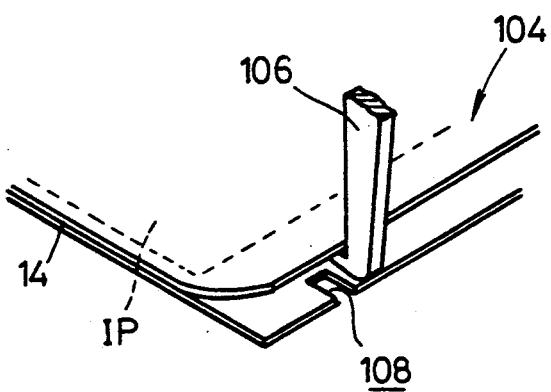
FIG. 5 is a perspective view of an opening and closing means employed in the second embodiment.

Further, FIG. 5 shows an opening and closing means 104 employed in a further embodiment of the present invention. The opening and closing means 104 is different in structure from the aforementioned opening and closing means 36, and has a claw-shaped member 106 engageable with one of both sides of a light-intransmissive holder 14. The claw-shaped member 106 serves to lift the one side of the light-intransmissive holder 14 upwardly through a cut-away portion 108 defined in the other of both sides of the light-intransmissive holder 14, thereby opening the light-intransmissive holder 14.

The radiation image information reading apparatus according to the present invention constructed as described above has the following advantageous effects.

By simply loading a radiation image information reading apparatus with a supply container with a plurality of light-intransmissive holders stored therein, various processes for unloading a desired storage-type phosphor sheet from one of the light-intransmissive holders, photoelectrically reading image information from the unloaded storage-type phosphor sheet, erasing any remaining image information there from and for feeding the so-processed storage-type phosphor sheet to the corresponding light-intransmissive holder can be automatically carried out. In addition, the entire process for photographically recording radiation image information of an object on a storage-type phosphor sheet to thereby read the same therefrom can efficiently be performed.

It is also possible to promptly carry out a process for unloading a desired storage-type phosphor sheet by the opening and closing means and the feed means disposed in the sheet delivering mechanism. As a consequence, the entire reading process can efficiently be performed.

Having now fully described the invention, it will be apparent to those skilled in the art that many changes and modifications can be made without departing from the spirit or scope of the invention as set forth herein.

What is claimed is:

1. A radiation image information reading apparatus comprising:
   unloading means for unloading a plurality of light-intransmissive holders one by one from a supply container for accommodating therein said plurality of light-intransmissive holders, said holders being used to hold therein respectively corresponding storage-type phosphor sheets with radiation image information stored and recorded thereon;
   sheet discharging means for discharging a storage-type phosphor sheet from one unloaded out of said plurality of light-intransmissive holders;
   reading means for photoelectrically reading radiation image information stored and recorded on the storage-type phosphor sheet thus discharged;
   erasing means for erasing any remaining radiation image information on the so-read storage-type phosphor sheet therefrom;
   sheet loading means for loading a light-intransmissive holder with the so-erased storage-type phosphor sheet; and
   carrying-in means for carrying said light-intransmissive holder with the so-erased storage-type phosphor sheet held therein into a receiving container;
   said loading means comprising:
   means for opening and closing said light-intransmissive holder; and
   means for feeding said storage-type phosphor sheet into said light-intransmissive holder.

2. A radiation image information reading apparatus according to claim 1, wherein said sheet discharging means serves as said sheet loading means, and includes light-intransmissive holder supporting means angularly movable with respect to a supply magazine as said supply container and a receiving magazine as said receiving container, said supply magazine being used to accommodate therein said plurality of light-intransmissive holders in which said storage-type phosphor sheets with the radiation image information stored and recorded thereon are held, and said receiving magazine being used to receive therein said light-intransmissive holder with said erased storage-type phosphor sheet held therein.

3. A radiation image information reading apparatus according to claim 2, wherein said light-intransmissive holder supporting means comprises a pair of guide plates for guiding each of said light-intransmissive holders therealong, and pairs of support rollers for supporting therebetween one of opposite ends of each of said light-intransmissive holders, said one being opened in a transverse direction of each of said light-intransmissive holders.

4. A radiation image information reading apparatus according to claim 1, wherein said opening and closing means comprises a pair of pin members for pressing one of both sides of each of said light-intransmissive holders in an upward direction so as to be positioned away from the other thereof, thereby providing an opened one end of each of said light-intransmissive holders, and a pair of tapered members activated to be inserted into said opened one end so as to further widen said opened one end.

5. A radiation image information reading apparatus according to claim 4, wherein said tapered members have feed means capable of inserting a storage-type phosphor sheet into each of said light-intransmissive holders and unloading the same therefrom in a state in which said feed means is being inserted into said opened one end of each of said light-intransmissive holders.

6. A radiation image information reading apparatus according to claim 5, wherein said feed means includes pairs of rollers supported by said tapered members.

7. A radiation image information reading apparatus according to claim 4, wherein said pin members are swingably supported by a resilient member, and include thin-walled portions held in engagement with said tapered members when said one side of each of said light-intransmissive holders is pressed upward, and thick-walled portions held in engagement with said tapered members when said tapered members are moved away from each of said light-intransmissive holders.

8. A radiation image information reading apparatus according to claim 1, wherein said unloading means comprises a pair of feed rollers rotatably movable into said supply container, and adhesive means applied on the outer peripheral surface of each of said feed rollers.

* * * * *